(12) United States Patent  (10) Patent No.: US 8,270,894 B2
Earl  (45) Date of Patent: Sep. 18, 2012

(54) RESPONSE AND COMMUNICATION SYSTEM AND METHOD FOR INTERACTING WITH AND BETWEEN AUDIENCE MEMBERS

(75) Inventor: Jeffrey Earl, Pevensey (GB)

(73) Assignee: Albert Hall Meetings, Ltd. (GB)

( * ) Notice: Subject to any disclaimer, the term of this patent is extended or adjusted under 35 U.S.C. 154(b) by 926 days.

(21) Appl. No.: 12/139,824

(22) Filed: Jun. 16, 2008

(65) Prior Publication Data

US 2008/0311943 A1   Dec. 18, 2008

Related U.S. Application Data

(60) Provisional application No. 60/944,349, filed on Jun. 15, 2007.

(51) Int. Cl.
H04W 88/00 (2009.01)
H04H 60/33 (2008.01)
H04H 20/71 (2008.01)

(52) U.S. Cl. ...................................... 455/2.01; 455/3.05

(58) Field of Classification Search .................. None
See application file for complete search history.

(56) References Cited

U.S. PATENT DOCUMENTS

| | | | |
|---|---|---|---|
| 3,766,523 A | 10/1973 | Brocker et al. | |
| 3,801,956 A | 4/1974 | Braum et al. | |
| 3,855,576 A | 12/1974 | Braun et al. | |
| 4,048,792 A | 9/1977 | Shriver et al. | |
| 4,238,893 A | 12/1980 | Komatsubara et al. | |
| 4,247,908 A | 1/1981 | Lockhart, Jr. et al. | |
| 4,251,865 A | 2/1981 | Moore et al. | |
| 4,356,484 A | 10/1982 | Eckhardt | |
| 4,392,132 A | 7/1983 | Derks | |
| 4,466,001 A * | 8/1984 | Moore et al. .................. | 340/9.17 |
| 5,093,786 A | 3/1992 | Derks | |
| 5,379,213 A | 1/1995 | Derks | |
| 5,596,313 A | 1/1997 | Berglund et al. | |
| RE35,449 E | 2/1997 | Derks | |

(Continued)

FOREIGN PATENT DOCUMENTS

WO   0213163 A2   2/2002

(Continued)

OTHER PUBLICATIONS

International Search Report and Written Opinion of the International Searching Authority, PCT/IB2008/001559, Jan. 21, 2009, 9 pages.

*Primary Examiner* — Philip Sobutka

(74) *Attorney, Agent, or Firm* — St. Onge Steward Johnston & Reens LLC

(57) ABSTRACT

A method and system for interacting with and between audience members located in the same or different locations is described including a central computer, at least one base station connected to the central computer, and a plurality of keypad units arranged to wirelessly transmit and receive signals from the base station. The keypad units may also be located remote to the central computer and the base station, and transmit and receive signals with the central computer via a communication network. The keypad units contain a data connector for transmitting and receiving signals via a wired connection to the central computer or the base unit. The keypad units are configured to enable numeric, text, and voice interaction with and between audience members.

26 Claims, 6 Drawing Sheets

U.S. PATENT DOCUMENTS

| | | |
|---|---|---|
| 5,682,142 A | 10/1997 | Loosmore et al. |
| 5,724,357 A | 3/1998 | Derks |
| 6,265,974 B1 | 7/2001 | D'Angelo et al. |
| 7,684,829 B2 * | 3/2010 | Jeong .......................... 455/566 |
| 2004/0155777 A1 | 8/2004 | Mitchell et al. |
| 2007/0021055 A1 | 1/2007 | Arseneau et al. |
| 2011/0009051 A1 * | 1/2011 | Khedouri et al. ............ 455/3.06 |

FOREIGN PATENT DOCUMENTS

| | | |
|---|---|---|
| WO | 2006079844 A1 | 8/2006 |

* cited by examiner

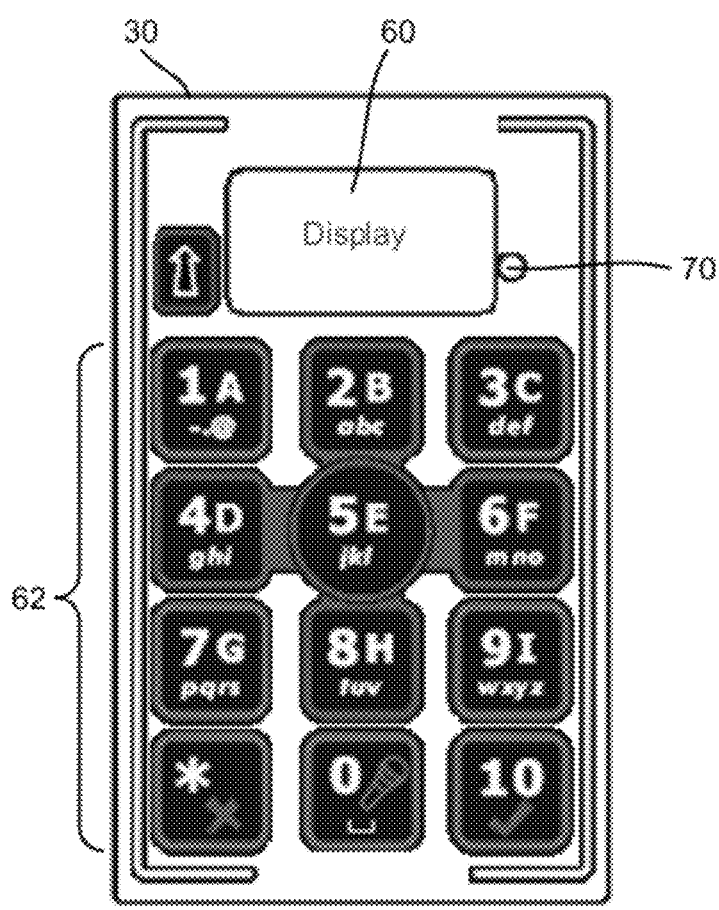
FIG. 4A
FIG. 4C
FIG. 4B

333
RESPONSE AND COMMUNICATION SYSTEM AND METHOD FOR INTERACTING WITH AND BETWEEN AUDIENCE MEMBERS

CROSS-REFERENCE TO RELATED APPLICATIONS

This application claims priority benefits under 35 U.S.C. §119(e) of the U.S. Provisional application No. 60/944,349, filed on Jun. 15, 2007.

FIELD OF THE INVENTION

This invention relates to an audience response and communication system and, in particular, to system and method for interacting with and between audience members located in the same or different locations.

BACKGROUND OF THE INVENTION

Audience response systems allow large groups of people, such as meeting participants or audience members, to wirelessly vote on a topic or respond to simple questions posed by an instructor or presenter. Various audience response systems are known and used in numerous applications such as education, audience participation, game shows, voting at conferences and the like, and opinion polls.

A typical audience response system comprises one or more base station RF transceivers that are connected to a computer including audience response system software, and a number of wireless keypads that incorporate a simple keypad and display. The base station transmits data representing a question to the keypads and each member of the audience enters their response to the question on their keypad (e.g., yes/no or numeric) and the responses are communicated to the base station. The responses may then be stored, tallied, and/or displayed using the audience response system software.

While several audience response systems are known and available in the marketplace, there is a desire for an improved system having advanced features beyond typical question and response capabilities.

SUMMARY OF THE INVENTION

The present invention provides an audience response and communication system and method that allows for a much broader range of responses than the typical yes/no and numerical responses possible in prior art systems. Additionally, the present invention provides a system and method that enables users to participate in a particular meeting and/or voting session through the Internet from anywhere in the world.

An audience response and communication system, according to an aspect of the invention, includes a central computer, at least one base station connected to the central computer, and a plurality of keypad units each arranged to wirelessly transmit and receive signals with the base station. The base station is arranged to wirelessly transmit and receive signals with each keypad unit. At least one of said keypad units is local to the base station, and at least one of the keypad units is located remote to the central computer and the base station. At least one keypad unit transmits and receives signals with the central computed via a communication network.

The central computer may be arranged to receive, process and output information received from at least one of the base stations. Furthermore, each of the keypad units may further comprise at least one radio frequency transmitter, at least one radio frequency receiver, and at least one data connector for wired connection to a computer. The data connector may comprise at least one of USB connection and firewire connection.

In another embodiment, the audience response and communication system may comprise the base station that is capable of transmitting and receiving signals in a plurality of channels, and the plurality of keypad units each capable of transmitting and receiving signals in a plurality of channels.

In yet another embodiment, the audience response and communication system may have at least two base stations and the keypad units that are adapted to selectively transmit and receive signals with one of the base stations based on proximity to one of the base stations. Additionally, the base station may be connected to the central computer via a wired or wireless connection.

Furthermore, each keypad unit may be adapted to respond within a particular time slot after receiving a group signal from at least one of the base stations, and the base station may be adapted to rebroadcast the responses in time slots corresponding to each of the keypad units.

In another embodiment, each keypad unit may include at least one processor, a display, and a number of keys for data entry. The key may be navigation keys for selecting and rearranging items on said display or alphabet keys for inputting text for transmission. Additionally, the keypad units may be arranged to receive a plurality of items from the central computer, organize the items, and provide the items to the central computer in a particular order. The keypad units may also be arranged to transmit multiple responses in sequence. Furthermore, each keypad unit may have a microphone and an audio connector for connection to an external audio device to enable audio responses and communications.

The base station and the keypad units may be arranged to selectively vary the channels used to transmit signals. The base station may also be arranged to send configuration messages, and each of the keypad units may be arranged to receive configuration messages. Such messages may contain details of a channel which should be used for transmission and reception, and may be triggered automatically by signal interference or manually by operator's request.

An audience response and communication system, according to another aspect of the invention, includes a central computer, at least one base station connected to the central computer, a plurality of keypad units each comprising at least one transmitter for wirelessly transmitting signals to the base station and at least one receiver for receiving signals from the base station. The base station comprises at least one transmitter for wirelessly transmitting signals to said keypad units and at least one receiver for wirelessly receiving signals from said keypad units. Each of the keypad units also has a data connector for transmitting and receiving signals via wired connection to the central computer or to the base station. In some embodiments, at least one of the keypad units is located remote to the central computer and the base station, and is arranged to transmit and receive signals with the central computer via a communication network.

In another embodiment, each of the keypad units may also transmit and receive signals with other keypad units. Additionally, at least one of the keypad units may be arranged to transmit and receive signals with a local computer, and the local computer may be arranged to transmit and receive signals with the central computer via a communication network.

Furthermore, the data connector may be arranged to power the keypad units via a connection to a power source.

In yet another embodiment, the central computer may be adapted to generate a roster of users and communicate the roster to each keypad unit. Then, each keypad unit may select another keypad unit from the roster and transmit a message to the selected keypad unit. The central computer may also receive, process and output information from one or more keypad units.

An embodiment of an audience response and communication method is also provided. The method may include the steps of providing a central computer, transmitting information from the central computer to at least one remotely located computer via a communication network and to a base station connected to the central computer, providing a plurality of keypad units, each adapted to receive the information from at least one of the remotely located computers and the base stations, receiving a response via at least one of the keypad units, transmitting the response from the at least one keypad unit to one of the remotely located computers, and communicating the response from the remotely located computer to the central computer via the communication network.

In some embodiments, the method further includes receiving a second response via a second one of the keypad units, wirelessly transmitting the second response from the second one of the keypad units to the base station, and communicating the second response from the base station to the central computer.

These and other objects, advantages and features of this invention will become apparent upon review of the following specification in conjunction with the drawings.

BRIEF DESCRIPTION OF THE DRAWINGS

FIGS. 4A-4C illustrate an exemplary keypad unit of the audience response and communication system shown in FIGS. 1-3.

DETAILED DESCRIPTION OF THE INVENTION

Described herein is an audience response and communication system and method for enabling interaction with and between audience members, located in the same or different locations. Embodiments of the system enable numeric, text, and/or voice interaction with audience members in the same or different locations. Some aspects of the system described herein, such as some hardware components and communication protocols, are described in more detail in commonly owned International Patent Application No. PCT/GB2006/000322. As such, the disclosure of PCT/GB2006/000322 is incorporated herein by reference in its entirety.

Figure 1:
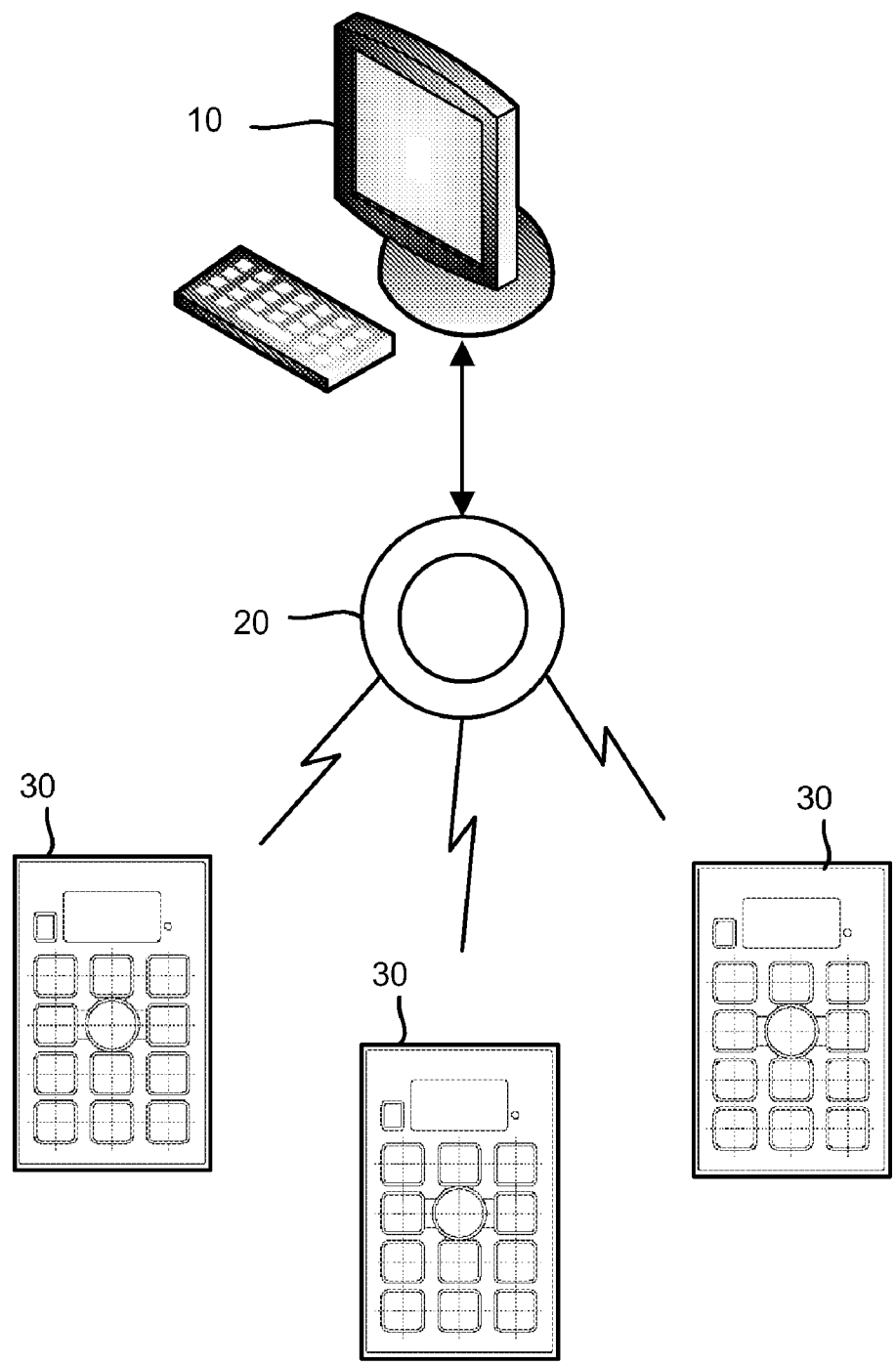
FIG. 1 illustrates an audience response and communication system according to an exemplary embodiment of the present invention.

FIG. 1 shows one exemplary audience response and communication system according to the present invention. The system includes a central computer 10 and at least one base station 20. The base station 20 includes at least one radio frequency (RF) transceiver (e.g., or at least one transmitter and at least one receiver) and at least one processor. The base station 20 is in communication with the central computer 10 via a wired or wireless connection. For example, the base station 20 and central computer 10 may connect via a USB connection or an Ethernet connection or network. In some embodiments, the base station 20 includes two or more radios (e.g., RF transceivers) and two or more antennas. The system further includes a plurality of keypad units 30, each including at least one transmitter and at least one receiver (or at least one transceiver). Each of the keypad units 30 communicate wirelessly with the base station 20 via one or more radio frequency channels.

In some embodiments, the master 20 may be arranged to selectively vary the channel or channels used to transmit or receive signals. For example, the system may determine a primary radio channel for communication between the base station 20 and keypad units 30 for use during a meeting or session and at least one secondary channel. Signal strengths and/or power levels on the primary channel may be monitored by system during the session and the primary channel used provided that reception remains acceptable. If at any time during use reception is affected in any way, the system may automatically begin transmitting on the secondary channel. At any time during a meeting and/or session, the base station 20 may relay an update (e.g., configuration message) to indicate a channel setting to one or more keypad units 30. This update could be triggered by interference (automatically) or at the operators request (manually). This channel mapping feature ensures superior radio reception and provides a means to overcome any "dead-spots" in any room where radiated and/or reflected RF signals collide and cause a drop in transmission power.

The provision of multiple radios and antennas and/or a means to determine primary and secondary channels in some embodiments of the present invention enables increased range (e.g., 150 m or more) and increased power levels. Keypad units 30 may therefore be located in more distant locations from the base station 20. Power levels may also be precisely controlled and/or lessened to minimize interference, e.g., from adjacent meeting facilities.

Figure 2A:
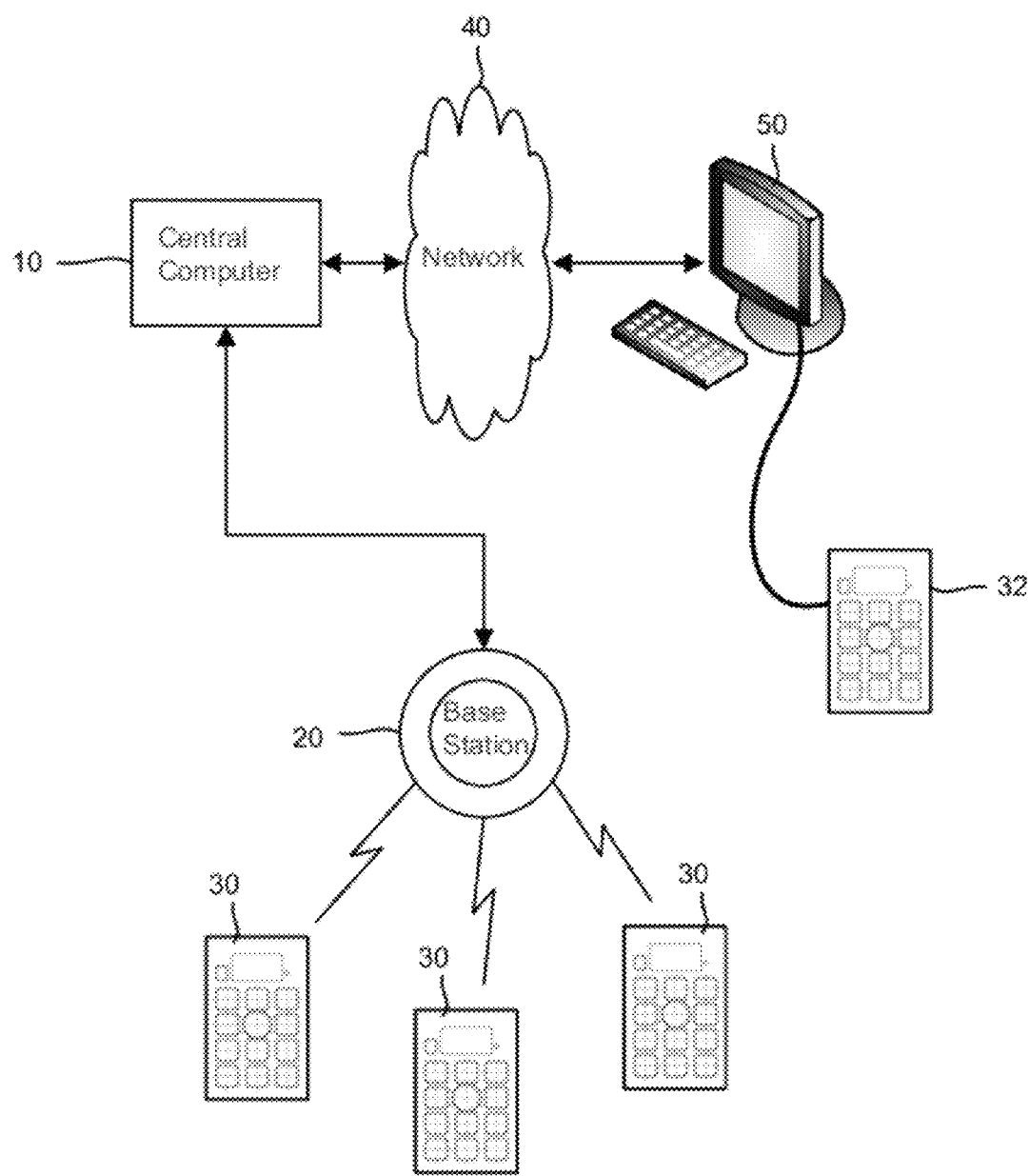
FIGS. 2A-2B illustrate additional views of the audience response and communication system shown in FIG. 1.
Figure 2B:
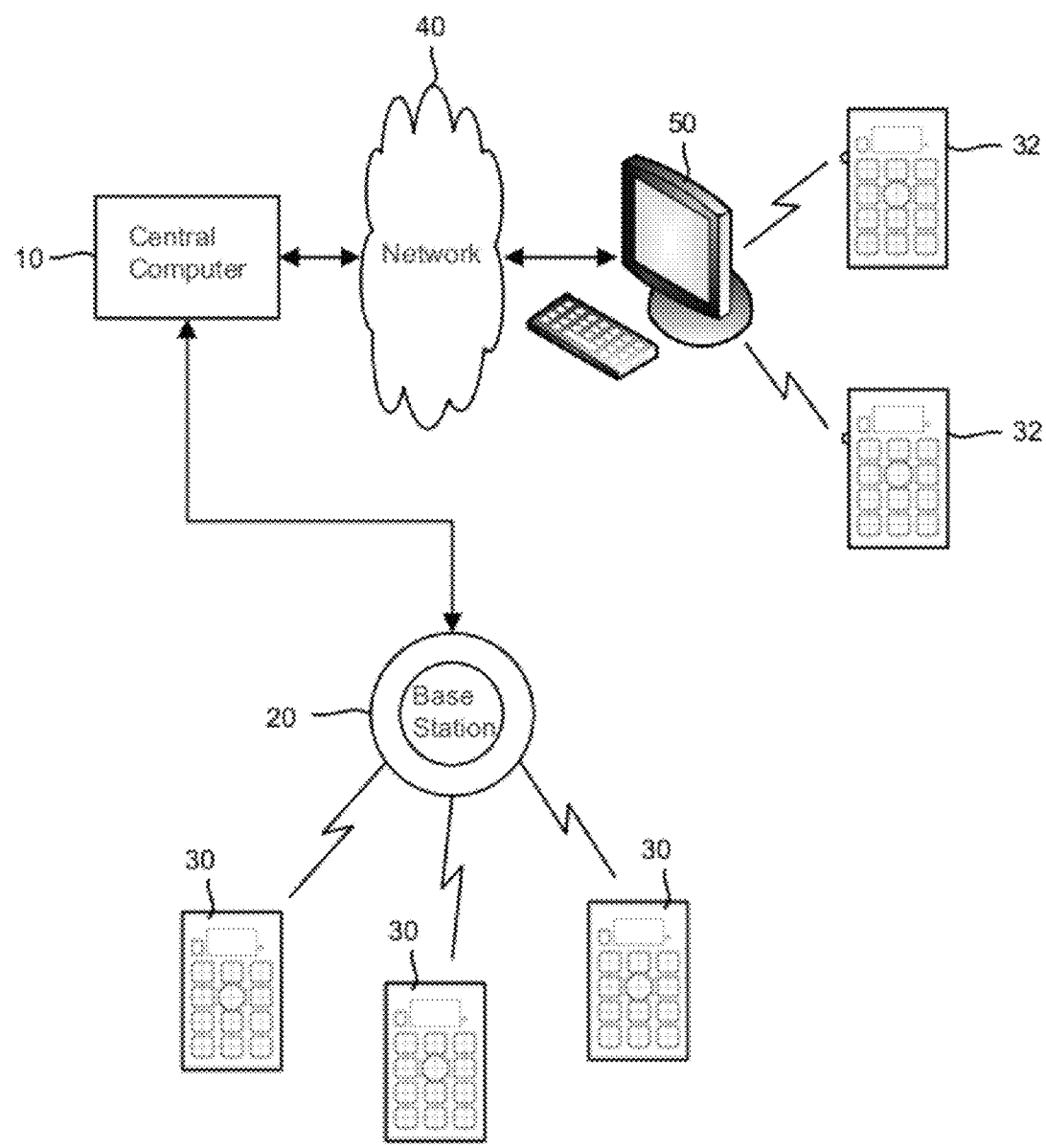

FIGS. 2A-2B show further views of the audience response system according to the present invention. In some embodiments, the system may communicate with any number of keypad units 30 located in the vicinity of the base station 20 and one or more keypad units 30 located in remote locations. For example, users may participate in a meeting and/or presentation via remote computers 50. Each keypad unit (e.g., keypad unit 32) is connectable to a computer 50. The keypad units 32 may be connectable by a wired connection as shown in FIG. 2A or a wireless connection as shown in FIG. 2B. Any number of users may then access a remote meeting via a communication network 40 (e.g., the Internet) and participate as if they were at the meeting. The users may receive live video, audio and/or presentations via the computer 50 and communicate responses to the central computer 10 using the keypad units 32.

Figure 3:
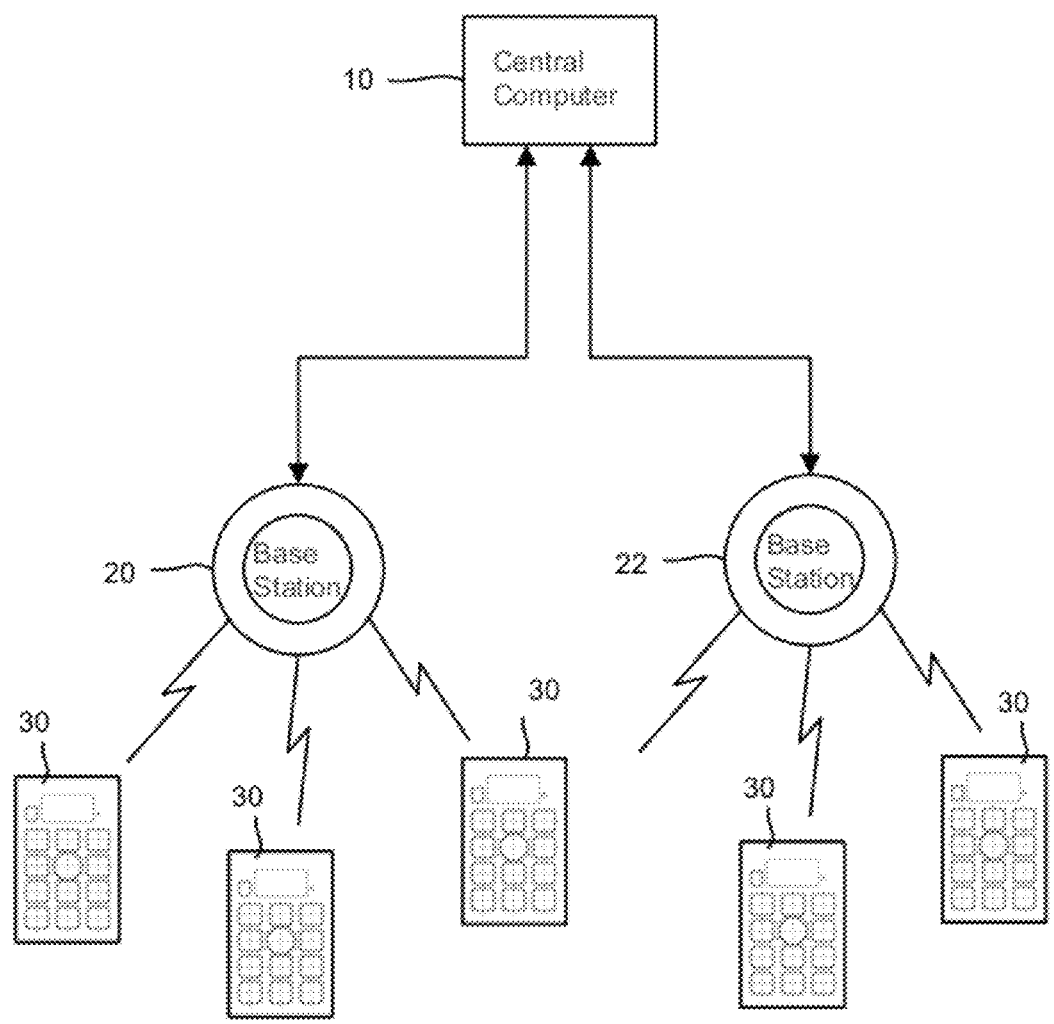
FIG. 3 illustrates another view of the audience response and communication system shown in FIG. 1.

FIG. 3 shows another view of the audience response system according to the present invention. As shown, the system may include two or more base stations 20/22 if desired. In some embodiments, each base station 20/22 may provide for communication with one or more particular groups of keypad units 30. For example, keypad units 30 within a particular proximity to a base station 20/22 may communicate with that particular base station 20/22. A keypad unit's base station 20/22 may be set prior to a meeting or at any time during the meeting (e.g., via a configuration message). In some embodiments, keypad units 30 may also roam between any number of base stations 20/22. For example, signal strengths and/or power levels may be monitored by the system (e.g., for each keypad unit) to determine the closest or best base station 20/22 to communicate with. Each keypad unit 30 may automatically register with the closest/best base station 20/22 or request confirmation to connect where more than one base station 20/22 is within range.

FIGS. 4A-4C show an exemplary keypad unit 30 of the audience response system according to the present invention. The keypad unit 30 is preferably small in size (e.g., credit card size) for ease of use and transportability. Each keypad unit 30 may include one or more transceivers for communicating with the base station 20 and at least one processor (not shown). In some embodiments, the processor can adjust its running speed. For example, a slower speed may be chosen at a given time to reduce battery consumption in the keypad unit 30. The processor and/or keypad may also enter an extremely low power mode during inactivity or turn off completely (e.g., after an extended period of inactivity). During periods of inactivity, the keypad units 30 may still listen for voting parameter updates and configuration messages without their having to run at full power. This feature greatly extends the battery life.

The keypad unit 30 includes a display 60. The display is preferably a matrix or multi-line display. For example, the display 60 may be a multi-line organic light emitting diode (OLED) display. The OLED display provides desirable brightness while conserving battery power. The display 60 may further be managed by an ambient light sensor 70 to ensure that the display 60 adjusts to the lighting conditions of the meeting room and conserves battery power.

The display 60 may display questions from the instructor and/or central computer 10, announcements, graphics, tables, lists, etc. In some embodiments, the display 60 provides an on-screen event agenda including, e.g., an agenda/Itinerary of presentations and timings sent (e.g., once or periodically) to the keypad unit 30 and stored locally to provide the user with an up to the minute plan of what's happening next. The agenda may be hidden and recalled using a recall icon on the keypad. The system may further provide for on-screen advertising messages via the display 60. For example, messages and/or graphics may be provided between votes in the form of a screen saver.

Each of the keypad units 30 also includes a data entry portion 62 with any number of keys, e.g., numbered 0 to 10 for voting and/or entering a response. The data entry portion 62 may also include alpha keys to enable users to enter text for transmission to the central computer 10 and/or other keypad units 30. Furthermore, the data entry portion 62 includes navigation keys or arrows for selecting or rearranging items on the display 40. In some embodiments, the position of a cursor controlled by the navigation keys may be periodically transmitted to the base station 20. This feature may be used, e.g., to communicate a particular selection or target indicated by the user on the display 60 or for various games. Therefore, the present invention provides for a much broader range of responses than the typical yes/no and numerical responses possible in prior art systems. Users may respond to any number of questions with text, text message the instructor or other keypad users, provide information such as a name and/or email address for use in generating a meeting attendance list, etc.

The system further allows users to enter and transmit fractional or decimal responses. For example, a question posed by an instructor and/or the central computer 10 may include "10 divided by 3." An audience member and/or user may then enter the fractional or decimal answer 33*33. A user may also be asked to complete a particular equation. Another example may be as follows: "Given the following expenses are required to be spent in a day, how much money will you have left from £100? Rail Fare £21.90; Breakfast £3.45; Taxi £4.90 with a 10% tip. Your time starts now!" The answer, £69.26, may be entered as 69*26.

In some embodiments, the data entry portion 62 includes light sources under the keys such as light emitting diodes (LED's), electroluminescent pads and guided light sources such as LED's and light pipes or transparent layers. Illumination may be single color or a color combination either produced through filters or different colored emitting devices. All of the keys may be illuminated at a given time or active keys only may be illuminated. For example, if only a limited number of answer choices are responsive to a given question (e.g., 1, 2, and 3) the keys corresponding to non-responsive answers may not illuminate. The LED's may also function to notify or alert (e.g., buzz) a particular user. For example, all keys may light up at once, flash or appear to rotate by sequencing the on/off of the LEDs to gain a user's attention (e.g., indicate a winner).

Each keypad unit 30 may also include a data connector 64. The connector 64 may be, e.g., a serial bus interface connection such as USB connection and/or an IEEE 1394 interface or firewire connection. In some embodiments, the connector 64 may include wireless capability (e.g., Bluetooth, wireless USB, etc). The connector 64 enables users to connect the keypad unit 30 to a computer 50 for remote meeting participation (i.e., without requiring a base station at the remote location). By establishing a connection between the keypad unit 30 and a computer 50, a user can join a voting session and/or meeting through the Internet from anywhere in the world. The user can see and hear a live presentation and, when the audience is asked to vote, the user can participate as if he/she was there.

Furthermore, the connector 64 enables a small group of users to participate in a local meeting without a base station 20. For example, a group of users may simply plug in or otherwise connect their keypad units to a computer 10/50 and run a local meeting/presentation with voting. In some embodiments, each keypad unit 30 in the group connects wirelessly to the PC, e.g., via wireless USB or Bluetooth connections to the PC. The computer 10/50 may run audience response software located on the computer 10/50 or software located in a remote database and accessed via the Internet. In some embodiments, one keypad unit 30, when connected to a computer 10/50, may also act as a short range base station for other keypad units 30.

The connector 64 also enables a keypad unit 30 to be powered via a connection to a computer 50 or other power source. For example, a keypad unit 30 may be powered or, in some embodiments, recharged via a wired connection (e.g., USB) to a computer 50. The connector 64 further enables various internal or production functions such as the programming of soft IDs, software updates or additions, etc.

Each of the keypad unit 30 may also include a means for audio and/or voice responses and communications. For example, the keypad unit 30 may include a microphone 66 for transmitting voice responses from the user and one or more speakers for receiving audio. The microphone 66 may be positioned in any suitable location within or on the keypad unit 30. The keypad unit 30 may also include an audio connector 68 for connecting an external audio device, such as a detachable headset, to the keypad unit 30. In some embodiments, the audio connector 68 may be a short range wireless connector for enabling the use of a wireless headset.

By means of the microphone 66 and/or audio connector 68, an instructor or presenter may immediately engage particular audience members in a large group without waiting for a separate microphone to be provided. The presenter may, via the central computer 10, signal a particular keypad (e.g., and activate the keypad's microphone) to request a voice response. For example, the presenter may buzz a particular keypad by activating a buzz light or lights on the keypad or transmit a text message requesting the user to speak. The buzz lights may include the keypad LED's or one or more separate lights on the keypad unit 30. Keypad unit users may also request the opportunity to speak. For example, a user may press a microphone button on the data entry portion of the keypad. A signal is then displayed to the presenter on the central computer 10 indicating that the user of the particular keypad would like to speak.

In some embodiments, the central computer 10 includes a roster of users (e.g., organized by keypad ID) to provide the user's name and other information to the presenter so that he/she can personally welcome them to speak. The presenter may further control each keypad's microphone 66 via the central computer 10 to turn microphones on and off.

In addition to signaling a particular user to speak or respond, the buzz light(s) of the keypad unit 30 may be used for numerous signaling purposes. For example, the presenter may activate one or more buzz lights to identify winners (e.g., correct response) or, alternatively, to identify those who provided an incorrect response and who are now eliminated from subsequent rounds or questions. Software executing on the central computer 10 may also randomly buzz a particular keypad and/or display a message inviting that person to the stage or to stand and answer a next quiz question. The buzz lights may also be accompanied by a sound and/or a message on the display.

Each of the keypad units 30 may include diagnostic features for determining information and/or statuses of the particular keypad unit 30. Various keys or combinations of keys on the keypad unit 20 (e.g., shift+1, etc) may also be used to display such information. For example, a user may, by pressing a key or keys, determine the keypad unit's battery level, signal strength, keypad soft ID, keypad hard ID, channel, etc.

The audience response system according to the present invention may employ the communication protocol described in PCT/GB2006/000322 or any other suitable communication protocol. For example, each keypad unit 30 may respond within a particular time slot after receiving a group signal from the base station 20 (e.g., time division multiplexing).

In some embodiments, the system provides for multi-digit voting to allow users to transmit more than one response or item (e.g., in response to a multiple choice question). For example, an instructor and/or the central computer 10 may ask users to select their #1, #2 and #3 choice from this list. Users may then enter a first choice, second and third choice. In some embodiments, choices are separated by a separation character or key (e.g., "*") and the group of choices transmitted with a send key. If a mistake is made during entry, a user may clear or back up to make a correction. In multi-digit or multi-vote situations, the keypad unit's response may include several short data packets in quick succession.

After receiving votes and/or responses from a group of keypad units 30, the base station 20 may rebroadcast responses and/or votes (e.g., via a rebroadcast module) in time slots corresponding to each of the particular keypads 30. Alternatively, the base station 20 may transmit an acknowledgement message at the end of each voting group that contains a flag bit for each keypad unit 30 in the group.

Responses and/or votes received from the keypad units 30 may be processed and displayed by the central computer 10, e.g., via a monitor and/or projector. The central computer 10 includes any number of audience response software applications for tallying votes, displaying individual responses or statistic results, indicating correct answers and/or winners, etc. For example, the central computer 10 may populate and display a list of a plurality of text responses received from keypad units 30 in response to a question posed the group.

In addition to providing responses and communicating with the central computer 10, each of the keypad units 10 may communicate with one another in some exemplary embodiments of the present invention. For example, one user may transmit a text message to the base station 20 to be delivered to another user(s). A mail icon or other indicator may be displayed to notify the user that a message has arrived. For example, a roster of users generated by the central computer 10 may be available either on a display of the central computer 10 or on the keypad unit 30 via the display 60. A user may then enter or select one or more particular users or keypad units as a recipient and transmit their message.

Figure 5:
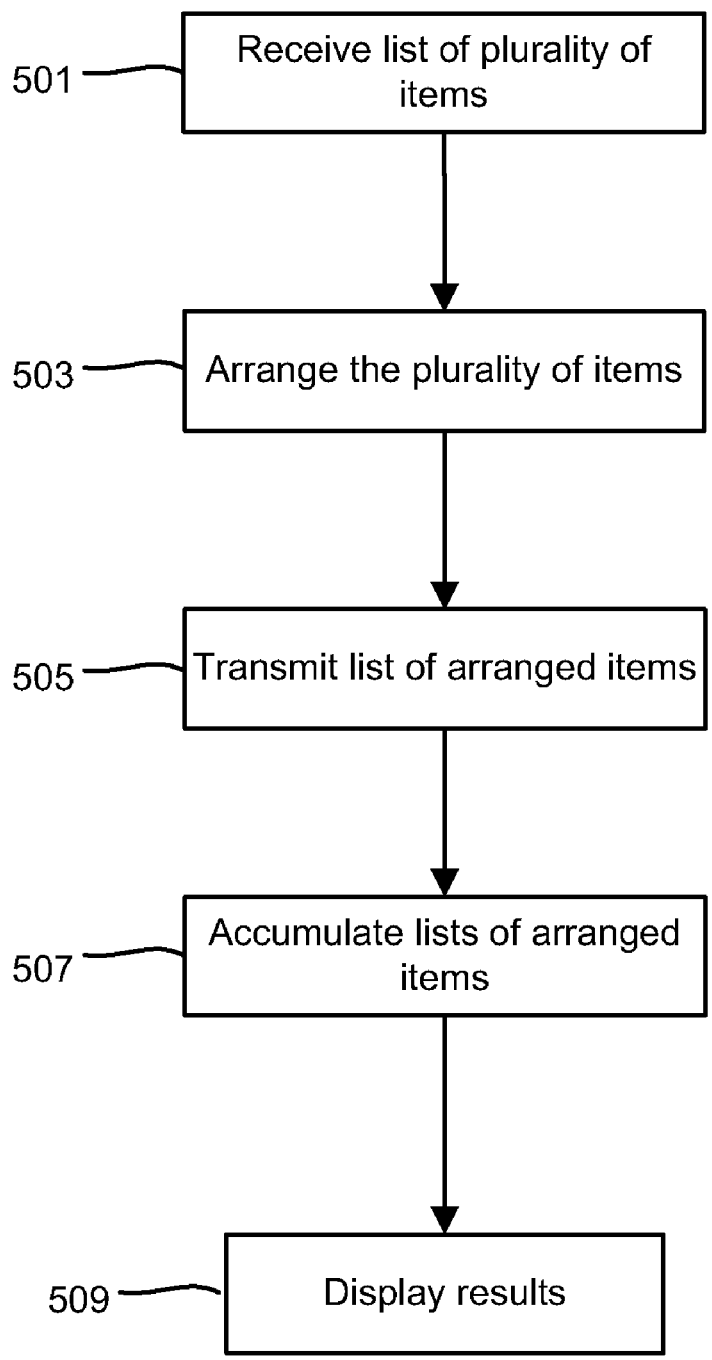
FIG. 5 illustrates a method of receiving and displaying responses from audience members employable by the system shown in FIGS. 1-3.

FIG. 5 shows an exemplary method of receiving and displaying responses from audience members employable by the disclosed system. The exemplary method illustrates a function of the system that allows users to receive a plurality of items from the central computer 10, organize or arrange the items, and provide the items to the central computer 10 in a particular (e.g., revised) order. Lists received from a plurality of keypad units 30 may then be accumulated to illustrate the feelings of those assembled in the meeting. This feature offers superior participation and active involvement in the meeting such that the participant is an equal to the moderator.

The method includes a first step of providing a plurality of items, e.g., in a first order, and receiving the items or list of items on one or more keypad units (step 501). The first order may be a particular order or a random order. Once received, each user may arrange the list of items on his/her keypad unit (e.g., reorder, sort, rank, and/or categorize) (step 503). For example, a user may arrange the list of items using cursor navigation keys or arrows and a select button on the keypad unit 30. The user may move the cursor on the display 60 down to the item desired to be ranked first, highlight and/or select the item. A second choice is then selected, and so on. Alternatively, users may be asked only to rank their top few choices rather than arrange the entire list of items. A user may also revisit and/or deselect items if desired. The list of choices will then appear in the chosen order on the display 60.

After manipulating the list of items, each user transmits (e.g., press send) his/her arranged list of items to the central computer 10 via the base station 20 (step 505). For example, the user may press a send key on the keypad unit after visually confirming his/her selections. The central computer 10 then accumulates the lists of arranged items received from a plurality of keypad units 30 and displays or transmits the results to indicate the cumulative opinion of the group.

Although the invention has been described with reference to a particular arrangement of parts, features and the like, these are not intended to exhaust all possible arrangements or features, and indeed many modifications and variations will be ascertainable to those of skill in the art.

What is claimed is:

1. An audience response and communication system, comprising:
   a central computer;
   at least one base station connected to said central computer;
   a plurality of keypad units each arranged to wirelessly transmit and receive signals with said base station;
   wherein said base station is arranged to wirelessly transmit and receive signals with each of said keypad units;
   wherein at least one of said keypad units is located remote to said base station;

wherein the at least one keypad unit transmits and receives signals with said central computed via a communication network;

wherein each of said keypad units is arranged to receive a plurality of items from said central computer, allow a user to organize said plurality of items into a particular order, and provide the items to the central computer in the particular order; and wherein each of said keypad units comprises a microphone to enable audio responses and communications.

2. The audience response and communication system according to claim 1, wherein said central computer is arranged to receive, process and output information received from at least one said base station.

3. The audience response and communication system according to claim 1, wherein each of said keypad units further comprises at least one radio frequency transmitter, at least one radio frequency receiver, and at least one data connector for wired connection to a computer for transmitting and receiving signals with the wired connection to the central computer.

4. The audience response and communication system according to claim 3, wherein said data connector comprises one of a USB connection and/or a firewire connection.

5. The audience response and communication system according to claim 1, wherein the system includes at least two base stations, wherein said keypad units are adapted to selectively transmit and receive signals with one of at least two said base stations based on proximity to said base stations.

6. The audience response and communication system according to claim 1, wherein said base station is connected to said central computer via a wired connection.

7. The audience response and communication system according to claim 1, wherein said base station is connected to said central computer via a wireless connection.

8. The audience response and communication system according to claim 1, wherein each said keypad unit is adapted to respond within a particular time slot after receiving a group signal from said at least one base station, and said at least one base station is adapted to rebroadcast the responses in time slots corresponding to each of said keypad units.

9. The audience response and communication system according to claim 1, wherein each of said keypad units further comprises at least one processor, a display, and a plurality of keys for data entry.

10. The audience response and communication system according to claim 9, where at least some of the keys include a light source.

11. The audience response and communication system according to claim 9, wherein said keys or a graphical interface include navigation keys or indicators for selecting and rearranging items on said display.

12. The audience response and communication system according to claim 9, wherein said keys or a graphical interface include alphabet keys for inputting text for transmission.

13. An audience response and communication system comprising,
a central computer;
at least one base station connected to said central computer;
a plurality of keypad units each arranged to wirelessly transmit and receive signals with said base station;
wherein said base station is arranged to wirelessly transmit and receive signals with each of said keypad units;
wherein at least one of said keypad units is located remote to said base station;

wherein the at least one keypad unit transmits and receives signals with said central computed via a communication network;

wherein each of said keypad units is arranged to receive a plurality of items from said central computer, allow a user to organize said plurality of items into a particular order, and provide the items to the central computer in the particular order; and wherein each of said keypad units is arranged to transmit multiple responses in sequence and in response to a single request.

14. An audience response and communication system comprising,
a central computer;
at least one base station connected to said central computer;
a plurality of keypad units each arranged to wirelessly transmit and receive signals with said base station;
wherein said base station is arranged to wirelessly transmit and receive signals with each of said keypad units;
wherein at least one of said keypad units is located remote to said base station;
wherein the at least one keypad unit transmits and receives signals with said central computed via a communication network;
wherein each of said keypad units is arranged to receive a plurality of items from said central computer, allow a user to organize said plurality of items into a particular order, and provide the items to the central computer in the particular order; and
wherein said base station is capable of transmitting and receiving signals via a plurality of channels.

15. The audience response and communication system according to claim 14, wherein at least one said base station is arranged to selectively vary the channel used to transmit signals.

16. An audience response and communication system comprising,
a central computer;
at least one base station connected to said central computer;
a plurality of keypad units each arranged to wirelessly transmit and receive signals with said base station;
wherein said base station is arranged to wirelessly transmit and receive signals with each of said keypad units;
wherein at least one of said keypad units is located remote to said base station;
wherein the at least one keypad unit transmits and receives signals with said central computed via a communication network;
wherein each of said keypad units is arranged to receive a plurality of items from said central computer, allow a user to organize said plurality of items into a particular order, and provide the items to the central computer in the particular order; and
wherein each of said keypad units is capable of transmitting and receiving signals via a plurality of channels.

17. The audience response and communication system according to claim 16, wherein each of said keypad units is arranged to selectively vary the channels used to transmit signals.

18. The audience response and communication system according to claim 1, wherein at least one said base station is arranged to send a configuration message and each of said keypad units is arranged to receive the configuration message, said message comprising details of a channel which should be used for transmission and reception.

19. The audience response and communication system according to claim 18, wherein the configuration message is sent automatically upon detection of signal interference.

20. An audience response and communication system comprising:
- a central computer;
- at least one base station connected to said central computer;
- a plurality of keypad units each comprising
  - at least one transmitter for wirelessly transmitting signals to said base station and
  - at least one receiver for receiving signals from at least one said base station;
- wherein said base station comprises at least one transmitter for wirelessly transmitting signals to said keypad units and at least one receiver for wirelessly receiving signals from said keypad units;
- wherein each of said keypad units further comprises a data connector for transmitting and receiving signals via a wired connection to at least one of the central computer and the base station;
- wherein each of said keypad units is arranged to receive a plurality of items from said central computer, allow a user to organize said plurality of items into a particular order, and provide the items to the central computer in the particular order; and
- wherein said central computer is adapted to generate a roster of the users of the plurality of keypad units and communicate said roster to each of said keypad units.

21. The audience response and communication system according to claim 20, wherein at least one of said keypad units is located remote to said central computer and said base station, and is arranged to transmit and receive signals with said central computer via a communication network.

22. The audience response and communication system according to claim 20, wherein each of said keypad units is arranged to transmit and receive signals with other said keypad units.

23. The audience response and communication system according to claim 20, wherein at least one of said keypad units is arranged to transmit and receive signals with a local computer, and wherein said local computer is arranged to transmit and receive the signals with said central computer via a communication network.

24. The audience response and communication system according to claim 20, wherein said data connector is arranged to power said keypad unit via a connection to a power source.

25. The audience response and communication system according to claim 20, wherein each of said keypad units is adapted to select another keypad unit from said roster and transmit a message to said selected keypad unit.

26. The audience response and communication system according to claim 20, wherein said central computer is arranged to receive, process and output information from one or more said keypad units.

* * * * *